United States Patent
McIntosh et al.

(10) Patent No.: US 6,934,888 B2
(45) Date of Patent: Aug. 23, 2005

(54) METHOD AND APPARATUS FOR ENHANCING INPUT/OUTPUT ERROR ANALYSIS IN HARDWARE SUB-SYSTEMS

(75) Inventors: Gordon D. McIntosh, Austin, TX (US); Sophia Mai-Simpson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 10/093,436

(22) Filed: Mar. 7, 2002

(65) Prior Publication Data

US 2003/0172323 A1 Sep. 11, 2003

(51) Int. Cl.[7] .................................................. G06F 11/00
(52) U.S. Cl. ............................ 714/43; 714/44; 714/56
(58) Field of Search ............................... 714/43, 44, 56

(56) References Cited

U.S. PATENT DOCUMENTS

| | | | | |
|---|---|---|---|---|
| 4,144,589 A | | 3/1979 | Baker et al. ................. 365/203 |
| 5,978,938 A | * | 11/1999 | Kaiser et al. ................. 714/48 |
| 6,012,137 A | | 1/2000 | Bublil et al. .................. 712/36 |
| 6,012,148 A | | 1/2000 | Laberge et al. ................. 714/2 |
| 6,223,299 B1 | * | 4/2001 | Bossen et al. .................. 714/5 |
| 6,253,250 B1 | * | 6/2001 | Evans et al. .................. 709/253 |
| 6,260,159 B1 | * | 7/2001 | Garnett et al. ................. 714/15 |
| 6,502,208 B1 | | 12/2002 | McLaughlin et al. ......... 714/25 |
| 6,557,121 B1 | * | 4/2003 | McLaughlin et al. ......... 714/44 |
| 6,594,785 B1 | | 7/2003 | Gilbertson et al. ........... 714/48 |
| 6,643,727 B1 | * | 11/2003 | Arndt et al. ................. 710/314 |
| 6,728,668 B1 | | 4/2004 | Kitamorn et al. ............. 703/22 |
| 2003/0163768 A1 | * | 8/2003 | Dawkins et al. .............. 714/43 |

* cited by examiner

*Primary Examiner*—Bryce P. Bonzo
*Assistant Examiner*—Michael Maskulinski
(74) *Attorney, Agent, or Firm*—Duke W. Yee; Mark E. McBurney

(57) ABSTRACT

A method, apparatus, and computer instructions for processing errors in a hierarchical hardware sub-system in the data processing system in which the hierarchical hardware sub-system includes a host processor bridge having a mapping registers section and a control and status registers section. In response to detecting an error freezing the mapping registers section in the host bridge, a component within the hierarchical hardware sub-system connected to the host bridge is identified to form a selected component. An address is written to a register within the control and status registers section of the host bridge in which the address is to an error register in the component. Data is read in response to a result from the address written in the register being placed in the control and status registers portion of the host bridge.

22 Claims, 3 Drawing Sheets

100 DATA PROCESSING SYSTEM

METHOD AND APPARATUS FOR ENHANCING INPUT/OUTPUT ERROR ANALYSIS IN HARDWARE SUB-SYSTEMS

CROSS REFERENCE TO RELATED APPLICATION

The present invention is related to the following application entitled: "Method and Apparatus for Analyzing Hardware Errors in a Logical Partitioned Data Processing System", Ser. No. 10/093,433, filed even date hereof, assigned to the same assignee, and incorporated herein by reference.

BACKGROUND OF THE INVENTION

1. Technical Field

The present invention relates generally to an improved data processing system, and in particular, to a method and apparatus for error analysis in a data processing system. Still more particularly, the present invention provides a method and apparatus for enhancing input/output error analysis in a hierarchical hardware sub-system in a logical partitioned data processing system.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

With respect to hardware resources in a LPAR system, these resources are disjointly shared among various partitions, themselves disjoint, each one seeming to be a stand-alone computer. These resources may include, for example, input/output (I/O) adapters, memory dimms, non-volatile random access memory (NVRAM), and hard disk drives. Each partition within the LPAR system may be booted and shutdown over and over without having to power-cycle the whole system.

In reality, some of the I/O devices that are disjointly shared among the partitions are themselves controlled by a common piece of hardware, such as a host Peripheral Component Interface (PCI) bridge, which may have many I/O adapters controlled or below the bridge. The host bridge and the I/O adapters connected to the bridge form a hierarchical hardware sub-system within the LPAR system. Further, this bridge may be thought of as being shared by all of the partitions that are assigned to its slots.

A host bridge contains mapping and control and status registers. The mapping registers allow a partition or other process to see or view I/O adapters, which may be located in slots below the host bridge. When an error occurs in a device, such as an I/O adapter connected to the host bridge, the mapping registers are typically frozen for use by an analysis routine. In this type of system, the mapping registers are disabled when an error occurs in any device mapped under the host bridge. This disabling or freezing of the mapping registers often makes the diagnosis of the original problem difficult and sometimes impossible. Additionally, any type of run-time correction of transient errors is impossible with this type of system. At a minimum, this problem causes several devices to be identified as bad and may be undesirable by a customer.

Therefore, it would be advantageous to have an improved method, apparatus, and computer instructions for enhancing I/O error analysis of hierarchical hardware sub-systems.

SUMMARY OF THE INVENTION

The present invention provides a method, apparatus, and computer instructions for processing errors in a hierarchical hardware sub-system in the data processing system in which the hierarchical hardware sub-system includes a host processor bridge having a mapping registers section and a control and status registers section. In response to detecting an error freezing the mapping registers section in the host bridge, a component within the hierarchical hardware sub-system connected to the host bridge is identified to form a selected component. An address is written to a register within the control and status registers section of the host bridge in which the address is to an error register in the component. Data is read in response to a result from the address written in the register being placed in the control and status registers portion of the host bridge.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
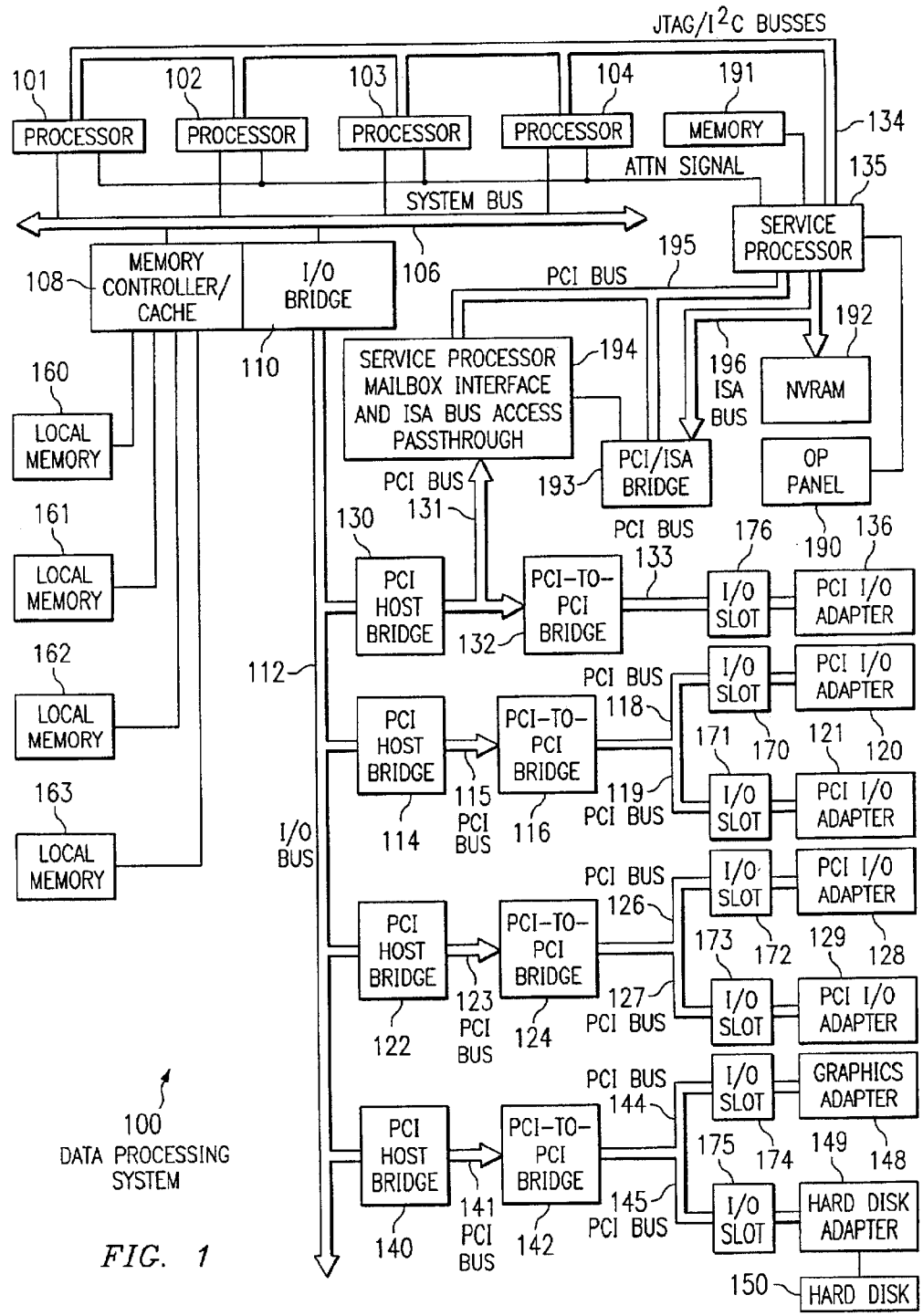
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and each of local memories 160–163 is assigned to one of the three partitions. For example, processor 101, local memory 160, and I/O adapters 120, 128, and 129 may be assigned to logical partition P1; processors 102–103, local memory 161, and PCI I/O adapters 121 and 136 may be assigned to partition P2; and processor 104, local memories 162–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O Adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101–104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases the host processors 101–104 for execution of the code loaded into local memory 160–163. While the host processors 101–104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
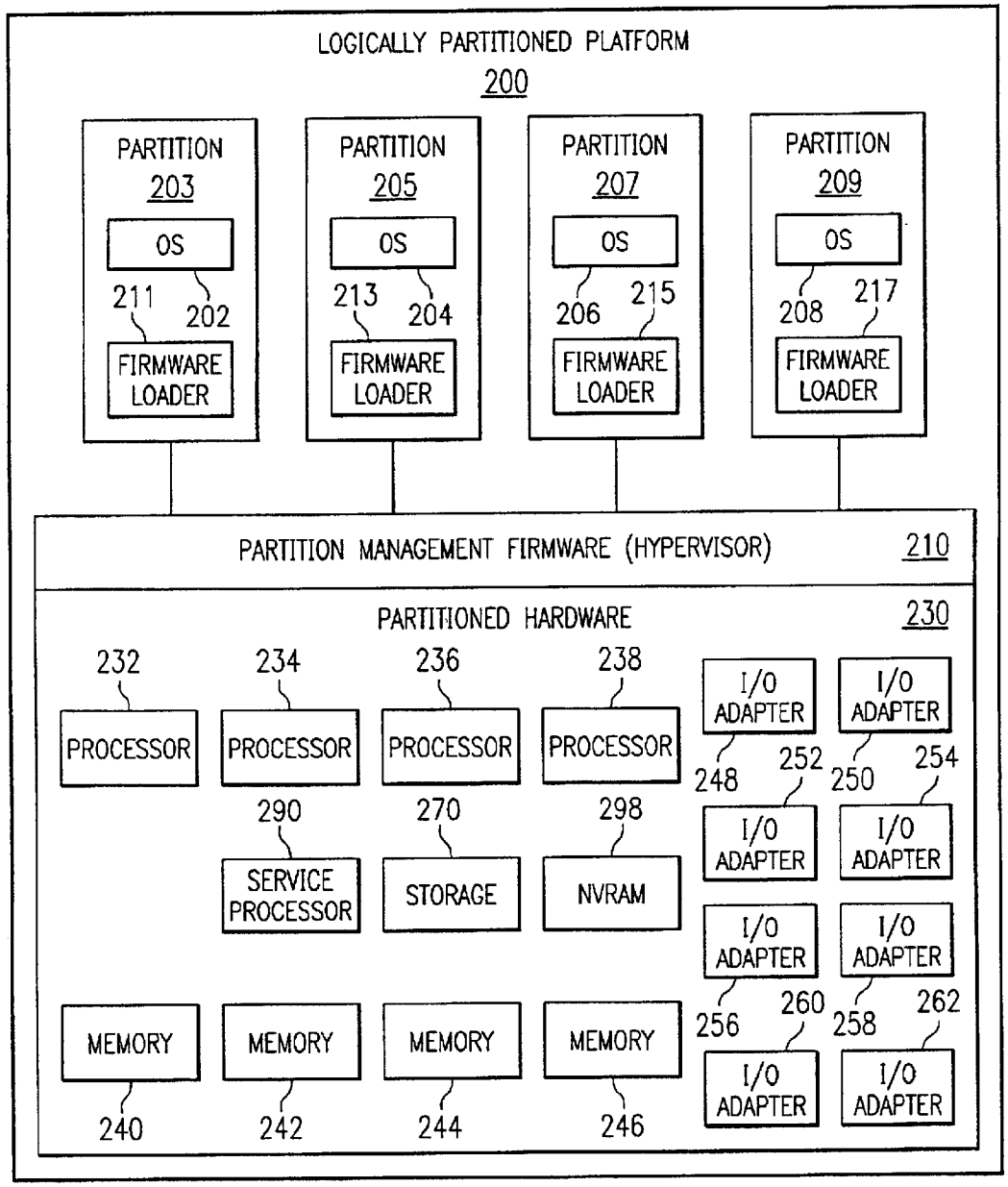
FIG. 2 is a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, data processing system 100 in FIG. 1. Logically partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209. Additionally, these partitions also include firmware loaders 211, 213, 215, and 217. When partitions 203, 205, 207, and 209 are instantiated, a copy of the open firmware is loaded into each partition by the hypervisor's partition manager. The processors associated or assigned to the partitions are then dispatched to the partitions' memory to execute the partition firmware.

Partitioned hardware 230 includes a plurality of processors 232–238, a plurality of system memory units 240–246, a plurality of input/output (I/O) adapters 248–262, and a storage unit 270. Partitioned hardware 230 also includes service processor 290, which may be used to provide various services, such as processing of errors in the partitions. Each of the processors 232–238, memory units 240–246, NVRAM storage 298, and I/O adapters 248–262 may be assigned to one of multiple partitions within logically partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 202, 204, 206, and 208 by virtualizing all the hardware resources of logically partitioned platform 200.

Figure 3:
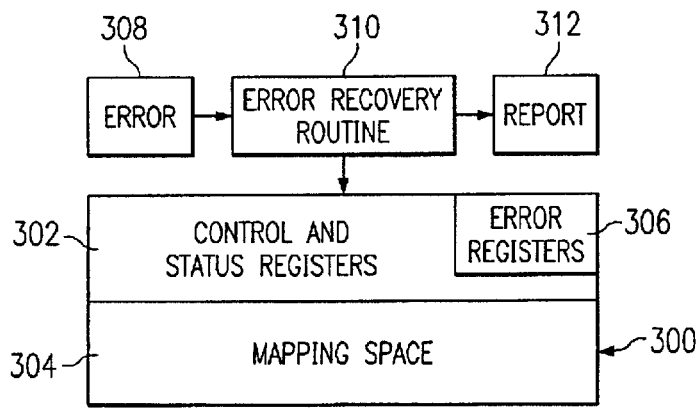
FIG. 3 is a diagram illustrating components used in input/output (I/O) error analysis in accordance with a preferred embodiment of the present invention.

With reference now to FIG. 3, a diagram illustrating components used in input/output (I/O) error analysis is depicted in accordance with a preferred embodiment of the present invention. In this example, registers 300 are registers, which may be located in a host bridge, such as PCI host bridge 130 or PCI host bridge 140 in FIG. 1.

Registers 300 includes a control and status registers section 302 and a mapping space 304. Mapping space 304 contains registers, which are used to view devices attached to the component in which registers 300 are located. In this case, the component is a PCI host bridge and the devices are adapters or slots connected to the host bridge to form a hierarchical hardware sub-system.

Typically, the registers and mapping space 304 are frozen or disabled upon the detection of an error. This condition usually makes the diagnosis of the original problem difficult. The mechanism of the present invention allows for enhancement of I/O analysis through the addition of error registers section 306. This section may contain one or more registers used to view or access registers in adapters connected to the host bridge. Upon detection of error 308, error recovery routine 310 may write an address into error registers section 306. This address may be, for example, an error register in an adapter, such as a graphics adapter. Writing of this address causes the contents of the error register to be returned to error registers section 306. The result returned may be in the same register in which the address was written or in a different register depending on the particular implementation.

With that information, error recovery routine 310 may analyze the error and generate report 312. Error recovery routine 310 may write additional addresses into error registers section 306 to obtain further information. In this manner, error recovery routine 310 may access all error registers in the hierarchical hardware sub-system. With this ability to access the different error registers in the hierarchical hardware sub-system, a full diagnosis of all hardware failures may be obtained. This mechanism allows error recovery routine 310 to identify which devices may have errors as well as which devices may be performing normally. Further, if a transient error is detected, the hardware state in the host bridge may be changed to unfreeze mapping space 304 and allow for the host bridge to function. After that, execution of the partition or partitions using these components may be resumed. Error registers section 306 is made available only to error recovery routines, such as, for example, a machine check interrupt handler.

Figure 4:
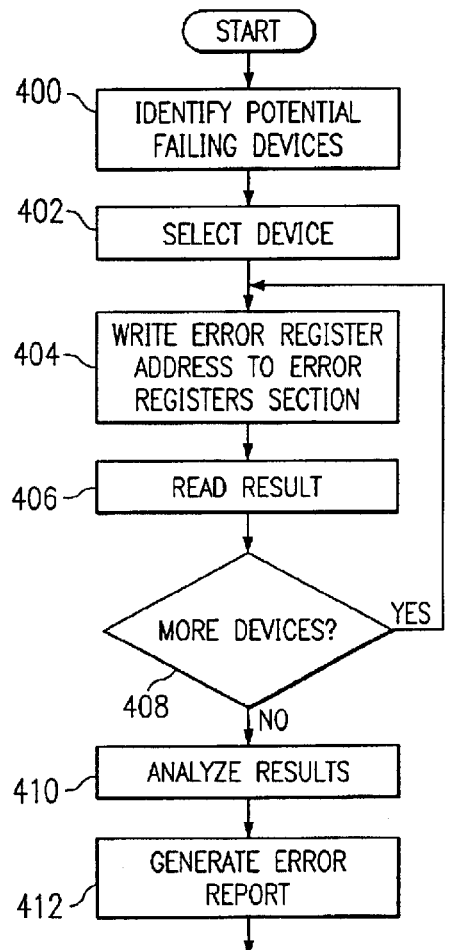
FIG. 4 is a flowchart of a process used for analyzing errors in accordance with a preferred embodiment of the present invention.

Turning next to FIG. 4, a flowchart of a process used for analyzing errors is depicted in accordance with a preferred embodiment of the present invention. The process illustrated in FIG. 4 may be implemented in an error recovery routine, such as error recovery routine 310 in FIG. 3. This error recovery routine may take different forms, such as a machine check interrupt handler.

The process begins by identifying potential failing devices connected to the host bridge (step 400). These devices may be identified through a database or configuration file listing devices associated with a host bridge. Additionally, the devices may be identified by querying the host bridge. A device is selected for processing (step 402). The error register address is written to the error registers section of the control and status registers in the host bridge (step 404). The result is read (step 406). This result may be read from the same register in which the address was written or from a different error register designed to receive results.

Next, a determination is made as to whether more devices are present, which have not been processed (step 408). If more devices are not present, the results are analyzed (step 410). Based on the results returned, the error recovery routine may identify which devices have generated an error and which devices are operating normally. An error report is generated (step 412) and the process terminates thereafter.

Returning again to step 408, if more devices are present, the process returns to step 404 as described above.

Figure 5:
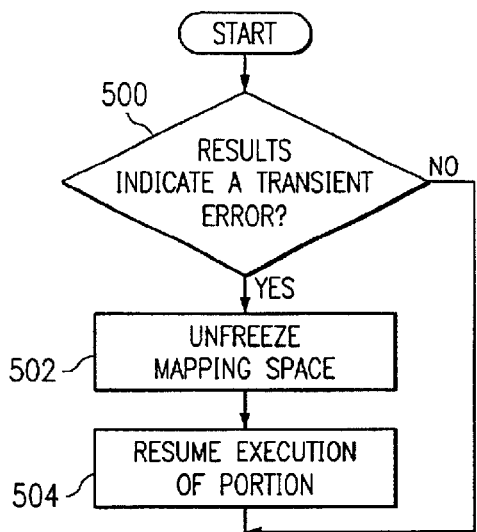
FIG. 5 is a flowchart of a process used for processing errors in accordance with a preferred embodiment of the present invention.

With reference next to FIG. 5, a flowchart of a process used for processing errors is depicted in accordance with a preferred embodiment of the present invention. The process illustrated in FIG. 5 may be implemented in an error recovery routine, such as error recovery routine 310 in FIG. 3.

The process begins by determining whether the results indicate the presence of a transient error (step 500). The results analyzed are received from error registers using the process described in FIG. 4. If the results indicate the presence of a transient error, the mapping space is unfrozen or enabled (step 502). Next, execution of the partition or partitions affected by the error is resumed (step 504) with the process terminating thereafter.

Returning to step 500, if the results do not indicate a transient error, the process terminates.

Thus, the present invention provides an improved method, apparatus, and computer instructions for analyzing and processing errors in a hardware sub-system. The mechanism of the present invention allows for obtaining data or other information used to identify and analyze errors even when mapping registers normally used to access devices are disabled. The mechanism of the present invention provides for one or more registers in the status and control registers section of the host bridge to be used for this type of access. These registers are useful because they are not disabled when an error occurs. In this manner, an error recovery routine may access all of the errors within a hardware sub-system through a single component, such as a host bridge.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing errors in a hierarchical hardware sub-system in the data processing system, wherein the hierarchical hardware sub-system includes a host bridge having a mapping registers section and a control and status registers section, the method comprising:

responsive to detecting an error freezing the mapping registers section in the host bridge, identifying a component within the hierarchical hardware sub-system connected to the host bridge to form a selected component;

writing an address to a register within the control and status registers section of the host bridge, wherein the address is to an error register in the component; and reading data in response to a result being placed in the control and status registers portion of the host bridge.

2. The method of claim 1 further comprising:

analyzing the data; and generating an error report.

3. The method of claim 1, wherein the identifying, writing, and reading steps are performed by a machine control interrupt handler.

4. The method of claim 1, wherein the data processing system is a logical partitioned data processing system.

5. The method of claim 1, wherein the component is connected to the host bridge through a bus.

6. The method of claim 1, wherein the component is connected to the host bridge by a connection to a first bus, an interface, and a second bus, wherein the first bus is connected to the interface and the component and the interface is connected to the host bridge by the second bus.

7. The method of claim 1, wherein the component is one of a hard disk drive adapter, a graphics adapter, or a memory.

8. The method of claim 1, wherein the error is a transient error and further comprising:

resetting the mapping registers section to allow access to the mapping registers section.

9. A data processing system comprising:

an input/output bus;

a plurality of processors connected to the input/output bus; and a hierarchical hardware subsystem including a host bridge and a set of components, wherein the host bridge includes a set of mapping registers and a set of control and status registers in which the set of control and status registers includes an error register, wherein the set of mapping registers are frozen in response to an error and wherein the error register is used to write addresses to registers in the set of components to retrieve data for error analysis.

10. The data processing system, wherein the plurality of processors is connected to the input/output bus through a system bus connected to an input/output bridge connected to the input/output bus.

11. The data processing system of claim 9, wherein the components include at least one of a hard disk drive adapter, a graphics adapter, or a memory.

12. The data processing system of claim 9 further comprising:
additional hierarchical hardware sub-systems.

13. A data processing system for processing errors in a hierarchical hardware sub-system in the data processing system in which the hierarchical hardware sub-system includes a host bridge having a mapping registers section and a control and status registers section, the data processing system comprising:
a bus system;
a communications unit connected to the bus system;
a memory connected to the bus system, wherein the memory includes a set of instructions; and
a processing unit connected to the bus system, wherein the processing unit executes the set of instructions to identify a component within the hierarchical hardware sub-system connected to the host bridge to form a selected component in response to detecting an error freezing the mapping registers section in the host bridge; write an address to a register within the control and status registers section of the host bridge in which the address is to an error register in the component; and read data in response to a result being placed in the control and status registers portion of the host bridge.

14. A data processing system for processing errors in a hierarchical hardware sub-system in the data processing system, wherein the hierarchical hardware sub-system includes a host bridge having a mapping registers section and a control and status registers section, the data processing system comprising:
identifying means, responsive to detecting an error freezing the mapping registers section in the host bridge, for identifying a component within the hierarchical hardware sub-system connected to the host bridge to form a selected component;
writing means for writing an address to a register within the control and status registers section of the host bridge, wherein the address is to an error register in the component; and
reading means for reading data in response to a result being placed in the control and status registers portion of the host bridge.

15. The data processing system of claim 14 further comprising:
analyzing means for analyzing the data; and
generating means for generating an error report.

16. The data processing system of claim 14, wherein the identifying means, writing means, and reading means are located in a machine control interrupt handler.

17. The data processing system of claim 14, wherein the data processing system is a logical partitioned data processing system.

18. The data processing system of claim 14, wherein the component is connected to the host bridge through a bus.

19. The data processing system of claim 14, wherein the component is connected to the host bridge by a connection to a first bus, an interface, and a second bus, wherein the first bus is connected to the interface and the component and the interface is connected to the host bridge by the second bus.

20. The data processing system of claim 14, wherein the component is one of a hard disk drive adapter, a graphics adapter, or a memory.

21. The data processing system of claim 14, wherein the error is a transient error and further comprising:
resetting means for resetting the mapping registers section to allow access to the mapping registers section.

22. A computer program product in a computer readable medium for processing errors in a hierarchical hardware sub-system in the data processing system, wherein the hierarchical hardware sub-system includes a host bridge having a mapping registers section and a control and status registers section, the computer program product comprising:
first instructions, responsive to detecting an error freezing the mapping registers section in the host bridge, for identifying a component within the hierarchical hardware sub-system connected to the host bridge to form a selected component;
second instructions for writing an address to a register within the control and status registers section of the host bridge, wherein the address is to an error register in the component; and
third instructions for reading data in response to a result being placed in the control and status registers portion of the host bridge.

* * * * *

UNITED STATES PATENT AND TRADEMARK OFFICE
CERTIFICATE OF CORRECTION

PATENT NO. : 6,934,888 B2
DATED : August 23, 2005
INVENTOR(S) : McIntosh et al.

It is certified that error appears in the above-identified patent and that said Letters Patent is hereby corrected as shown below:

<u>Column 8,</u>
Line 62, after "system" insert -- of claim 9 --.

Signed and Sealed this

Twenty-third Day of May, 2006

JON W. DUDAS
*Director of the United States Patent and Trademark Office*